(12) United States Patent
Hariu

(10) Patent No.: US 6,931,437 B2
(45) Date of Patent: Aug. 16, 2005

(54) CONCENTRATED SYSTEM FOR CONTROLLING NETWORK INTERCONNECTIONS

(75) Inventor: Takeo Hariu, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 803 days.

(21) Appl. No.: 09/842,138

(22) Filed: Apr. 26, 2001

(65) Prior Publication Data

US 2001/0039593 A1 Nov. 8, 2001

(30) Foreign Application Priority Data

Apr. 27, 2000 (JP) ......................................... 2000-127564
Jun. 14, 2000 (JP) ......................................... 2000-178076

(51) Int. Cl.⁷ ............................................... G06F 15/16
(52) U.S. Cl. ...................... 709/218; 709/221; 709/223; 709/227
(58) Field of Search ................................ 709/218, 221, 709/223, 227, 225, 229, 217

(56) References Cited

U.S. PATENT DOCUMENTS

| | | | | |
|---|---|---|---|---|
| 6,052,788 A | * | 4/2000 | Wesinger et al. | 713/201 |
| 6,138,162 A | * | 10/2000 | Pistriotto et al. | 709/229 |
| 6,154,775 A | * | 11/2000 | Coss et al. | 709/225 |
| 6,170,012 B1 | * | 1/2001 | Coss et al. | 709/229 |
| 6,691,147 B1 | * | 2/2004 | Arunkumar et al. | 709/200 |

* cited by examiner

*Primary Examiner*—David Wiley
*Assistant Examiner*—Phuoc H. Nguyen
(74) *Attorney, Agent, or Firm*—Oblon, Spivak, McClelland, Maier & Neustadt, P.C.

(57) ABSTRACT

Interfaces IF-A to IF-D connected to individual user networks, control function parts 41C1, 41C2 for providing an independent connection control function for each pair of user networks, and a function association selector 43 for associating each of the interfaces IF-A to IF-D to either control function part 41C1 or 412 are provided. User networks connected to respective interfaces IF-A to IF-D are connected to the control function parts 41C1, 41C2 to which they are previously associated, thus implementing communications between a plurality of user networks with a single system.

7 Claims, 10 Drawing Sheets

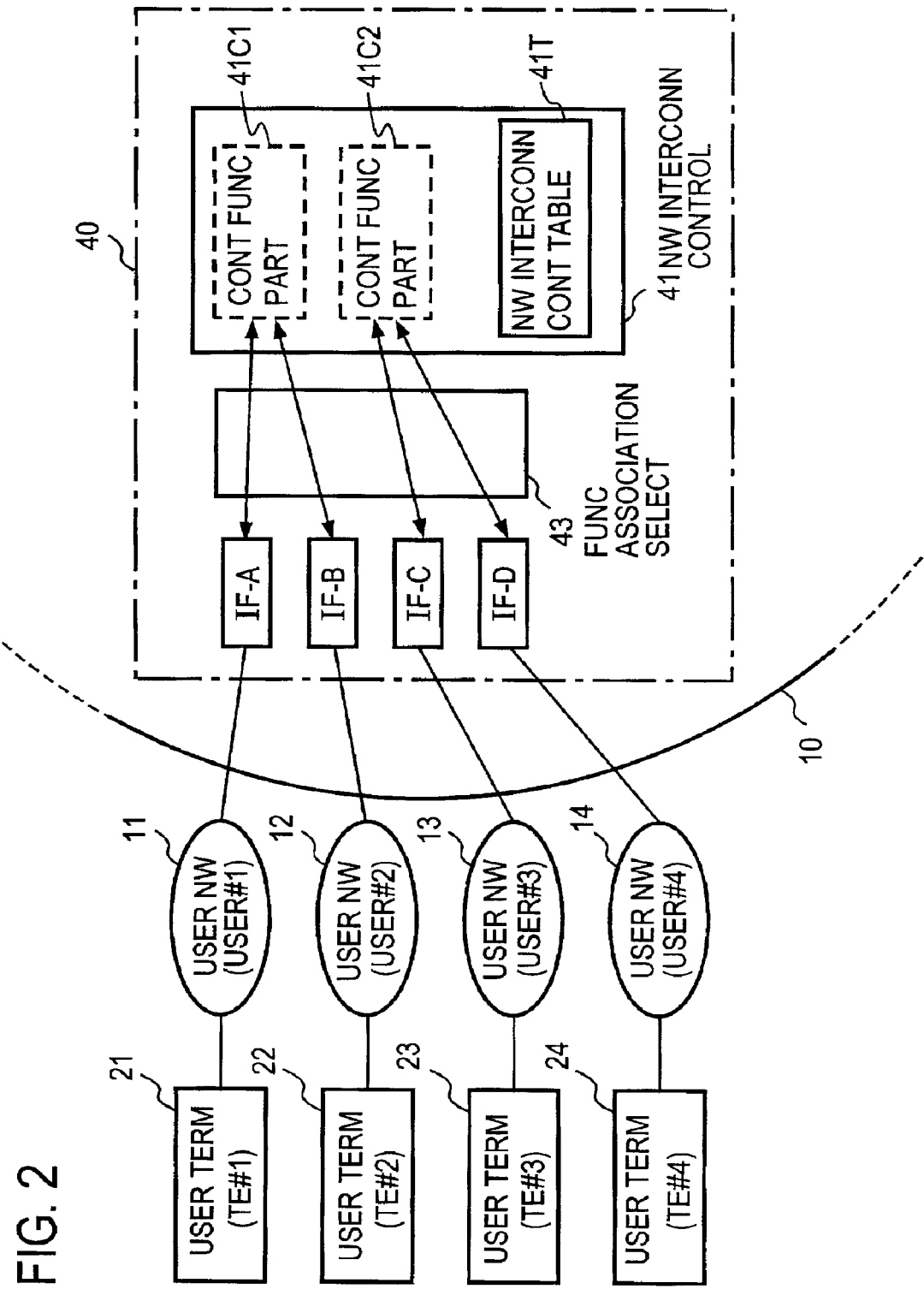

FIG. 4

| FIREWALL FUNC ID | INTERFACE IF-x | INTERFACE IF-y |
|---|---|---|
| FW#1 | A(USER#1) | B(USER#2) |
| FW#2 | C(USER#3) | D(USER#4) |
| ⋮ | | ⋮ |

| FW FUNC ID | DIRECTION | SENDER TERMINAL ADDRESS | RECEIVER TERMINAL ADDRESS | APPLICATIONS | CONN |
|---|---|---|---|---|---|
| FW#1 | x→y | a | c | AA | OK |
| FW#1 | x→y | b | d | BB | NO |
| FW#1 | y→x | c | a | BB | OK |
| FW#1 | y→x | d | b | AA | OK |
| FW#2 | x→y | a | c | BB | NO |
| FW#2 | x→y | b | d | BB | OK |
| FW#2 | y→x | c | a | AA | OK |
| ⋮ | ⋮ | ⋮ | ⋮ | ⋮ | ⋮ |

FIG. 8

| ADDRESS TRANSL FUNC ID | INTERFACE IF-x | INTERFACE IF-y | 431A |
|---|---|---|---|
| NAT#1 | A(USER#1) | B(USER#2) | |
| NAT#2 | C(USER#3) | D(USER#4) | |
| ⋮ | ⋮ | ⋮ | |

| NAT FUNC ID | DIRECTION | ADDRESS BEFORE TRANSLATION | ADDRESS AFTER TRANSLATION | TRANSLATION MODE |
|---|---|---|---|---|
| NAT#1 | x→y | a, b | aa1 | DYNAMIC |
| NAT#1 | x→y | c, d | cc1 | DYNAMIC |
| NAT#1 | x→y | e | ee1 | FIXED |
| NAT#1 | x→y | f | ff1 | FIXED |
| NAT#2 | x→y | a, b | aa2 | DYNAMIC |
| NAT#2 | x→y | c, d | cc2 | DYNAMIC |
| NAT#2 | x→y | e | ee2 | FIXED |
| ⋮ | ⋮ | ⋮ | ⋮ | ⋮ |

CONCENTRATED SYSTEM FOR CONTROLLING NETWORK INTERCONNECTIONS

BACKGROUND OF THE INVENTION

The present invention relates to a control system for establishing a connection between networks in a packet communication which occurs through networks located between terminals.

In the prior art, when a user which belongs to a certain user network on an extranet tries a packet communication with a different user network which is on the same extranet or another intranet which is connected to the former extranet through an internet, a control over the connection between networks such as one called a firewall for security purpose or another in which a network address in each user network or private network address is translated into a global network address which enables an external connection takes place. A conventional control system which establishes a connection between networks is only capable of establishing a connection between a pair of networks per system, and it has been required for a number of user networks that it is provided with such a connection control system for individual one of different pairs of user networks.

FIG. 1A shows a network system which employs conventional control system for connection between networks. Specifically, a network 10 contains a network interconnection control system 301 devoted to the connection between user networks 11 and 12, and another network interconnection control system 302 devoted to the connection between user networks 13 and 14 (such user networks being denoted as USER#1, #2, #3 and #4, respectively, which are in turn connected to user terminals 21, 22, 23 and 24, again denoted as TE#1, #2, #3 and #4, respectively). In the example shown in FIG. 1A, the user network 11 is separated from the user networks 13, 14 as is the user network 12. While only one user terminal is shown to be connected to each user network, it should be understood that a plurality of user terminals are normally connected to each user network.

A typical control system 30 is illustrated in FIG. 1B to stand for the network interconnection control systems 301 and 302. As shown, it comprises interfaces IF-A, IF-B connected to the user networks 11, 12, respectively, and a network interconnection controller 31 including a connection controller 31C and a network interconnection control table 31T.

Suppose that a packet from the user network 11 is received by the interface IF-A. The connection controller 31C then makes reference to the network interconnection control table 31T in order to execute a connection control which is defined for a sender terminal address and a receiver terminal address which are contained in the packet. If the control system 301 is constructed as a firewall equipment, its control table 31T includes a record indicating whether or not a communication is permitted for the detected pair of sender and receiver terminal addresses. If the communication is permitted, the received packet is delivered through the interface IF-B, but if not permitted, the packet is discarded without being delivered through the interface IF-B.

As can be understood from FIGS. 1A and 1B, the user network 11 is connected to the user network 12 through the network interconnection control system (firewall equipment) 301, and only a communication which is permitted according to the rules set-up in the firewall equipment 301 can be executed, thus allowing the user networks 11 and 12 to communicate with each other while maintaining the security of each.

Similarly, the user network 13 is connected to the user network 14 through the network interconnection control system (firewall equipment) 302, whereby only a communication which is permitted according to the rules set up in the firewall equipment 302 can be executed, thus allowing the user networks 13 and 14 to communicate with each other while maintaining the security of each. Since the user networks 11 and 12 are separated from the user networks 13 and 14, no communication is permitted therebetween.

When the network interconnection control system 301 is constructed as an address translation system (generally referred to as a network address translator: NAT), a private address of a sender terminal contained in a packet from the user network 11 which is received by the interface IF-A is translated into a global address according to translation rules which are contained in the network interconnection control table 31T, and is then delivered through the interface IF-B. The user network 11 is connected to the user network 12 through the address translation system 301 which includes the address translation rules to implement the address translation, thus permitting a communication between the user networks 11 and 12 through the address translation. Similarly, the user networks 13 and 14 are connected together through the address translation system 302 which performs an address translation on the basis of the address translation rules set up therein. In this manner, a communication is permitted between the user networks 13 and 14 through the address translation.

It is to be understood that the network interconnection control system 302 is constructed in a similar manner as the control system 30 shown in FIG. 1B.

Thus a practice in a conventional network interconnection control system is designed to achieve a connection for only a pair of user networks, and thus one such control system is provided for each pair of user networks as illustrated in FIG. 1A. An individual network interconnection control system must be subject to a maintenance work periodically, and hence a network which may deal with hundreds of user networks requires a tremendous amount of labor and time for its maintenance.

To cope with this problem, it may be contemplated to provide an interface in a conventional single network interconnection control system which allows a connection with all of user networks while defining connection controls for all the terminals in the network interconnection control table 31T, thereby providing a single concentrated network interconnection control system. However, this yields issues to be described below.

When a user on a user network uses a private address, it is possible that a duplicate terminal address is used by users on different user networks, and if the network interconnection control system is designed as a firewall equipment, there results a likelihood that a connection other than that intended by a sender terminal may be established. Alternatively, if the network interconnection control system is designed as an address translation system, there is a possibility that a wrong translated address may be retrieved from the table 31T.

Even if no duplicate address occurs between different user networks, the fact that a communication between users on different user networks is not logically isolated may result in impacting the security as would occur if a user uses a false address in his communication, thus leading to a possible communication between users on different user networks such as the user networks 11 and 14 in FIG. 1A which are inherently to be separated from each other. A security issue also occurs when a firewall table is frequently changed and an error occurs in the set-up thereof, enabling a communication by an inherently irrelevant user.

For these technical reasons, a network interconnection control system is independently provided for each pair of user networks.

As users who utilize a network increase in number with a popular use of an extranet, the number of communications with external users or between different user networks increases also. If the network interconnection control system is individually provided for such increased number of user networks, the overall installation cost increases in addition to the need for the maintenance of such an increased number of individual control systems.

SUMMARY OF THE INVENTION

It is an object of the present invention to provide a concentrated network interconnection control system capable of realizing a reduction in cost and a saving in maintenance by allowing communications between a plurality of user networks to be implemented with a single system.

The above task is accomplished by a concentrated network interconnection control system provided in a network which connects between a plurality of user networks, comprising a plurality of network interconnection controllers providing a network interconnection control function for each pair of user networks, and a function association selector for associating each interface with either one of the plurality of network interconnection controllers.

In accordance with the invention, a user network connected to each interface can be connected to a particular network interconnection controller which is previously associated therewith by the function association selector. Consequently, if there are a number of user networks, a single system can be used to implement a communication among a plurality of user networks without requiring the provision of a separate system for each user network.

BRIEF DESCRIPTION OF THE DRAWINGS

FIG. 2 is a block diagram of an exemplary network system incorporating a concentrated network interconnection control system according to the present invention;

FIG. 4 is a chart showing an example of a control function managing table shown in FIG. 3;

FIG. 5 is a chart showing an example of a firewall table shown in FIG. 3;

FIG. 8 is a chart showing an example of a control function managing table shown in FIG. 7;

FIG. 9 is a chart showing an example of an address translation table shown in FIG. 7;

DETAILED DESCRIPTION OF PREFERRED EMBODIMENTS

Figure 1A:
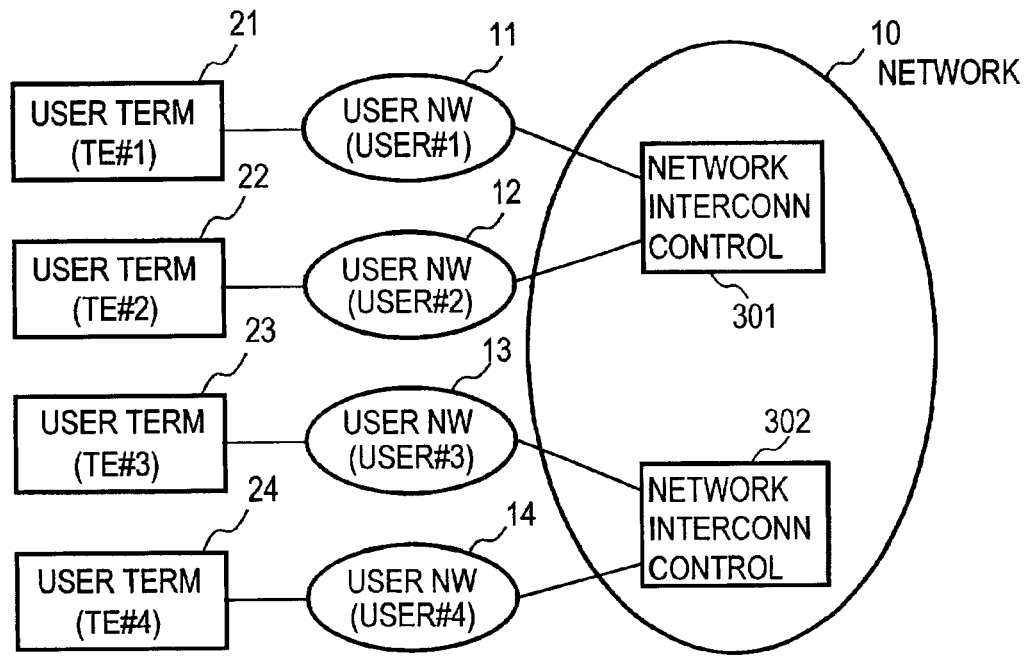
FIG. 1A is a schematic illustration of an example of a network system incorporating a conventional network interconnection control system.
Figure 1B:
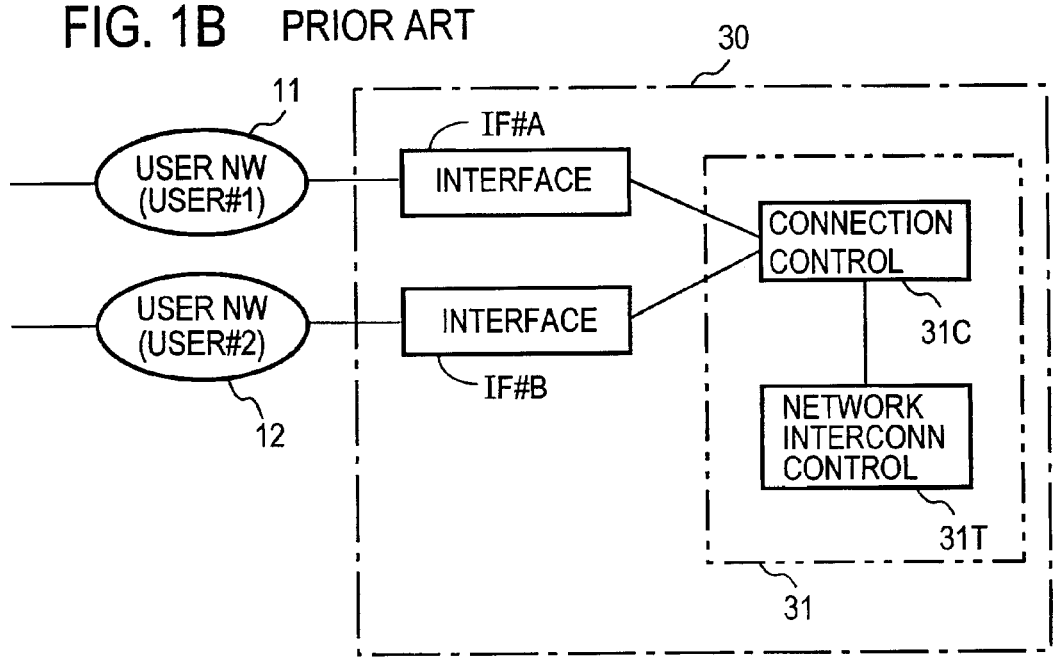
FIG. 1B is a block diagram showing the arrangement of the network interconnection control system shown in FIG. 1A.

FIG. 2 shows an exemplary network system incorporating a concentrated network interconnection control system 40 according to the present invention, and corresponding parts to those shown in the conventional arrangement are designated by like reference characters in this Figure as in FIG. 1. Specifically, the network 10 includes a concentrated network interconnection control system 40 which is connected to user networks 11, 12, 13, 14 (USER#1, USER#2, USER#3, USER#4), each of which is connected to user terminals 21, 22, 23, 24 (TE#1, TE#2, TE#3, TE#4), respectively.

The concentrated network interconnection control system 40 includes interfaces IF-A, IF-B, IF-C and IF-D which are connected to the user networks 11 to 14, respectively, a network interconnection controller 41 and a function association selector 43. The network interconnection controller 41 includes a control function part 41C1 which controls a connection between the user networks 11 and 12, a control function part 41C2 which controls a connection between the user networks 13 and 14, and a network interconnection control table 41T which defines the connection rules. As will be described later in connection with FIG. 3, the control function parts 41C1 and 41C2 are provided for different pairs of interfaces, and it should be understood that they represent functions which are executed by the network interconnection controller 41, but do not represent individual hardwares.

The user network 11 is connected to the user network 12 through the control function part 41C1, which carries out a control connection in accordance with the rules set up in the network interconnection control table 41T, thus allowing a connection and a communication to be performed between the user networks 11 and 12. Similarly, the user network 13 is connected to the user network 14 through the control function part 41C2, which performs a connection control in accordance with the rules set up in the network interconnection control table 41T, thus allowing a connection and a communication to be performed between the user networks 13 and 14.

In accordance with the invention, the user networks 11, 12 are logically separated from the user networks 13, 14, and the function association selector 43 is provided at this end. The function association selector 43 determines which packet received by a particular interface is to be transferred to which one of the control function parts and executes such transfer, and also determines which packet from a particular control function is to be transferred to which one of the interfaces and executes such transfer.

Figure 3:
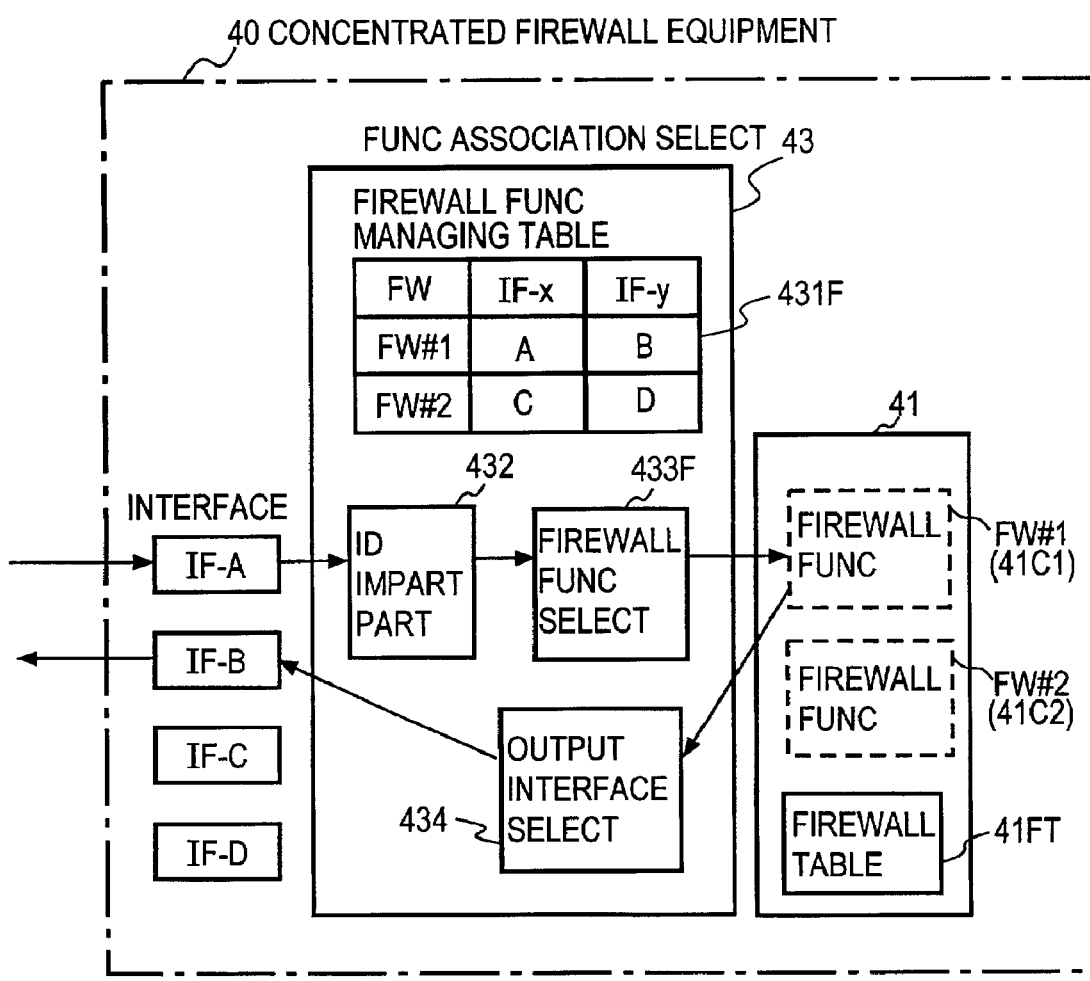
FIG. 3 is a block diagram of an arrangement in which the concentrated network interconnection control system of the invention is implemented as a concentrated firewall equipment.

FIG. 3 shows an exemplary arrangement in which the concentrated network interconnection control system according to the present invention is implemented in the form of a concentrated firewall equipment where the interfaces IF-A, IF-B, IF-C and IF-D are connected to the user networks 11, 12, 13 and 14, respectively, FW#1, FW#2 are firewall function parts serving as control function parts 41C1, 41C2 in FIG. 2, and 43 is a function association selector operating to associate each of the interfaces IF-A to IF-D to either firewall function part FW#1 or FW#2.

The interfaces IF-A to IF-D are connected to the user networks 11 to 14, respectively, in the manner shown in FIG. 2. The firewall function parts FW#1, FW#2 have functions which are executed by the network interconnection controller 41 in order to realize a firewall function independently for each pair of user networks.

The function association selector 43 comprises a firewall function managing table 431F which manages a relationship between the input and output interfaces IF-A to IF-D and corresponding firewall function parts FW#1, FW#2, an identifier imparting part 432 which retrieves an identifier, such as FW#1, for example, for a firewall function part which corresponds to an interface such as IF-A, for example, which has received a packet and imparts the identifier to the packet, a firewall function selector 433F which forwards the packet to the firewall function part FW#1 which corresponds to the imparted identifier FW#1, and an output interface selector 434 which retrieves an interface that corresponds to the identifier FW#1 imparted to the packet from the firewall function part FW#1 from the table 431F, removes the identifier FW#1 from the packet and transfers the packet to such interface IFB.

In the example shown in FIG. 3, only the interface IF-A is connected to the identifier imparting unit 432 in order to illustrate the operation of interconnecting user networks (or the operation of interconnecting interfaces), but it should be understood that all the interfaces IF-A to IF-D are connected to the identifier imparting unit 432. Similarly, all the interfaces IF-A to IF-D are connected to the output interface selector 434. The firewall function selector 433F is connected to the network interconnection controller 41 so that either firewall function part FW#1 or FW#2 can be selected for an output packet therefrom. Similarly, the output interface selector 434 can receive any result of connection from all the firewall function parts FW#1, FW#2.

FIG. 4 shows an example of the firewall function managing table 431F. The table is set up in the concentrated firewall equipment in order to manage a relationship between input and output interfaces and corresponding firewall function parts. As illustrated in FIG. 4, the firewall function managing table 431F is constructed such that a pair of interfaces IF-x and, IF-y which are subject to connection control are indicated as A, B; C, D with respect to each firewall function identifier FW#1, FW#2 . . . .

The table enables the concentrated firewall equipment to identify a particular user network from the interface and to process communications between different pairs of user networks to be processed separately. If a duplicate network address is used by different users, the interface which receives such communication is capable of identifying a particular user.

FIG. 5 shows that the firewall table 41FT has records indicating the direction in which a packet is to be transferred (or from which one of the pair of interfaces IF-x, IF-y the packet is transferred to the other), sender and receiver terminal addresses (shown by "a", "b", "c" and "d" in FIG. 5), of all the pairs subject to connection control, applications and a connection acceptability (i.e. accepted or rejected) with respect to the firewall function identifiers FW#1, FW#2. . . . The applications indicate the types of communication between sender and receiver terminals such as e-mail, FTP communication, HTTP communication, TELNET communication, for example. If required, other set-up items may also be included.

The firewall function parts FW#1, FW#2 are specified by the firewall function identifier added to the packet from the firewall function selector 433F, and represents a function which is executed by the network interconnection controller 41. Specifically, the network interconnection controller 41 retrieves a pair of terminal addresses which correspond to the firewall function identifier added to the packet from the firewall table 41FT, reads and executes a corresponding connection control (whether the connection is enabled or rejected).

The firewall table 41FT is provided as a single table of the connection rules for all the firewall function parts FW#1, FW#2, but may be provided separately for each firewall function part. The table enables to preset rules concerning whether the connection between each pair of user networks is accepted (OK) or rejected (NO).

Figure 6:
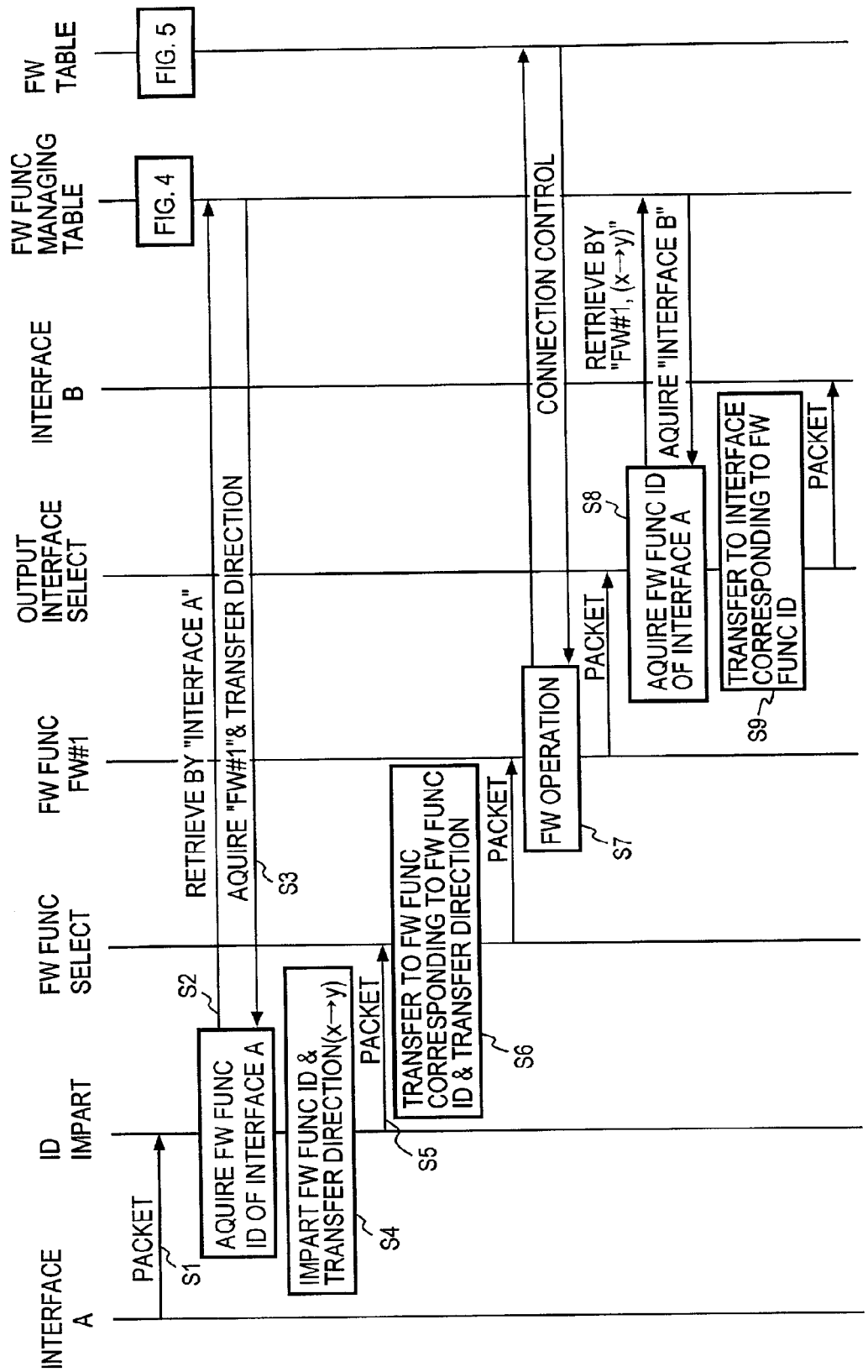
FIG. 6 is an illustration of operation of the concentrated firewall equipment.

FIG. 6 is an illustration of the entire operation of the concentrated firewall equipment shown in FIG. 3. To give an example, when the interface IF-A receives a packet from the user network 11 (step S1), the identifier imparting part 432 retrieves the firewall function managing table 43 IF shown in FIG. 4 (step S2) to acquire the firewall function identifier FW#1 and the direction of transfer, indicated as x→y, which correspond to the input interface IF-A (which is indicated simply as A in FIG. 6) that has received the packet (step S3), and imparts the identifier and the direction to the packet (step S4) and transfers it to the firewall function selector 433F (step S5). It is to be understood for each pair of interfaces IF-x, IF-y shown in the table of FIG. 4 that when the packet is received by one of the interfaces, this packet is transferred to the other interface by the connection control, with the direction of transfer being indicated as x→y or y→x.

On the basis of the firewall function identifier FW#1 added to the packet, the firewall function selector 433 transmits the packet to the corresponding firewall function part FW#1 (step S6).

The firewall function part FW#1 retrieves the firewall table 41FT based on the sender and receiver terminal addresses (generally called source address and destination address) "a", "b" of the packet, and if such connection is accepted, forwards the packet to the output interface selector 434 (step S7).

When the output interface selector 434 receives the packet which is delivered as a result of the connection control by the firewall function part FW#1, it retrieves the firewall function managing table 431F, and acquires the output interface, which is B in the present example, which corresponds to the firewall function identifier added to the communication and the direction of transfer (step S8), removes the function identifier from the packet and transfers it to the interface B (step S9).

While a single terminal is connected to each user network in FIG. 2, it is assumed in the firewall table shown in FIG. 5 that two terminals with private addresses "a" and "b" are connected to the user network 11, two more terminals with private addresses "c" and "d" are connected to the user network 12, and two terminals with private addresses "a"

and "b" and two terminals with private addresses "c" and "d" are connected to the user networks 13 and 14, respectively.

In the firewall table shown in FIG. 5, the firewall function part FW#1 performs a connection control with respect to the terminal addresses "a", "b", "c" and "d" which are connected to the user networks 11 and 12. For example, for the pair of user networks 11 and 12, a transmission from the terminal having the address "b" to the terminal having the address d is rejected. In the similar manner, the firewall function part FW#2 performs a connection control with respect to the addresses "a", "b", "c" and "d" of the terminals connected to the user networks 13 and 14 and, a transmission from the terminal having the address "a" to the terminal having the address "c" is rejected for the pair of user networks 13 and 14, as an example.

In this manner, in accordance with the invention, the function association selector 43 determines which one of the firewall function parts is to be applied to an interface which has received a packet from a user network, and the connection control is exercised upon the packet by that firewall function part, thus delivering the packet to an interface which forms a pair with the interface which has received the packet. Accordingly, each firewall function part does not receive a packet from any interface other than the corresponding interface in the pair.

By way of example, if a terminal 21 on the user network 11 and a terminal 23 on the user network 13 happen to have a common private address "a", a packet which is received by the interface IF-A from the terminal 21 is associated to the firewall function part FW#1 by the function association selector 43 and thus is subject to a connection control according to the firewall function part FW#1. In the similar manner, a packet which is received by the interface IF-C from the terminal 23 is associated to the firewall function part FW#2 by the function association selector 43 and thus is subject to a connection control according to the firewall function part FW#2. Consequently, even if the terminal 23 connected to the user network 13 has the address "a", the packet from the terminal 23 which is received by the interface IF-C cannot be subject to a connection control by the firewall function part FW#1.

When it is desired to add a terminal to an existing user network of the network system, it is only necessary to add a new pair or pairs of terminal addresses to the firewall function identifier in the firewall table 41FT together with the set-up of corresponding connection control.

When a new user network is to be added, another interface is provided which deals with the added user network, a new firewall function identifier which is intended for performing a connection control with other user networks to which the new user network would be connected as well as a pair or pairs of terminals which are connected to those user networks are added to the firewall table 41FT, thus setting up the connection control therefor. The association between the added firewall identifier and the interfaces may be added to the firewall function managing table 431F in the function association selector 43. The only hardware added is the interface. By contrast, according to the conventional network system, a new firewall equipment must be added for the sake of the added user network.

As described, when a new firewall function identifier, a direction of transfer and a connection control rule are added to items in the firewall table 41FT, a new firewall function part may be added and operated. When using such firewall table and retrieving from the table using the firewall function identifier added to the packet and the direction of transfer as retrieval keys, it is possible to determine a firewall operation which is to be used with respect to a packet. A packet from a different user network, if it has a common network address, is given a distinct firewall function identifier as a result of the difference in the input interface, and thus an independent firewall can be established.

Figure 7:
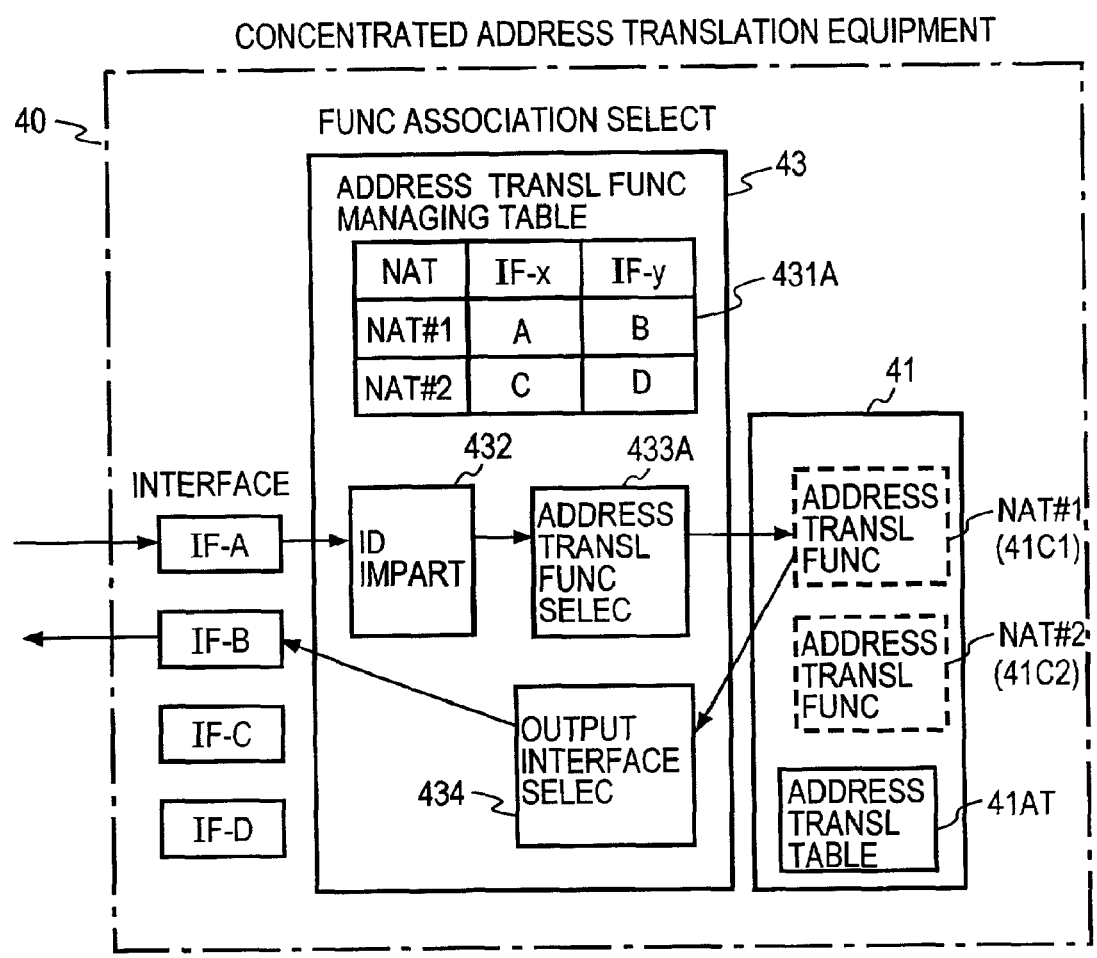
FIG. 7 is a block diagram of an arrangement in which the concentrated network interconnection control system of the invention is implemented as a concentrated address translation system.

FIG. 7 shows an arrangement in which the concentrated network interconnection control system according to the invention as shown in FIG. 2 is implemented as a concentrated address translation system. Differences over the concentrated firewall equipment shown in FIG. 3 reside in that the firewall function managing table 431F and the firewall function selector 433F of the function association selector 43 are replaced by an address translation function managing table 431A and an address translation function selector 433A along with that the firewall function parts FW#1, FW#2 and the firewall table 41FT of the network interconnection controller 41 are replaced by address translation function parts NAT#1, NAT#2 and an address translation table 41AT.

The address translation function parts NAT#1, NAT#2 represent functions which are carried out by the network interconnection controller 41, and afford the capability of address translation independently for each pair of user networks, where one of the user networks uses a private address while the other uses a global address. In the example shown in FIG. 7, it is assumed that the user network 11 connected to the interface IF-A uses private addresses and the user network 12 connected to the interface IF-B uses global addresses.

The address translation function managing table 431A manages a relationship between predetermined input and output interfaces IF-A to IF-D and corresponding address translation function parts NAT#1, NAT#2. An identifier imparting unit 432 retrieves an identifier, for example, NAT#1, for the address translation function part which corresponds to the interface having received the packet, which may be IF-A, for example, and the direction of transfer x→y from the table 431A, and imparts the identifier and the direction them to the packet. The address translation function selector 433A forwards the packet to the address translation function part NAT#1 which corresponds to the imparted identifier NAT#1.

The address translation function part NAT#1 of the network interconnection controller 41 uses the address translation function identifier NAT#1 which is imparted to the packet and an address before translation (private address) to retrieve the address translation table 41AT to acquire the translated address (for example, global address) and direction of transfer, and substitutes the global address for the private address in the packet to deliver the packet to the output interface selector 434. The output interface selector 434 retrieves from the function managing table 431A an interface which corresponds to the identifier NAT#1 imparted to the packet from the address translation function part NAT#I and the retrieved direction of transfer, removes the identifier NAT#1 and then transfers the packet to the interface IF-B.

In the example shown in FIG. 7, only the interface IF-A is shown as connected to the identifier imparting unit 432 for the convenience of illustrating the user network interconnecting operation or address translation operation, but it should be understood that all the interfaces IF-A to IF-D are connected to the identifier imparting unit 432. Similarly, all of the interfaces IF-A to IF-D are connected to the output interface selector 434. The address translation function selector 433A is connected to the network interconnection controller 41 and allows the output packet therefrom to be selectively subject to the execution by either address translation function part NAT#1 or NAT#2. The output interface selector 434 is also capable of receiving a result of address comparison from either address translation function part NAT#1 or NAT#2.

FIG. 8 shows an example of the address translation function managing table 431A, which manages a relationship between input and output interfaces to and from the user networks and corresponding address translation function parts. As illustrated in FIG. 8 as an example, the address translation function managing table 431A has records indicating a pair of interfaces IF-x, IF-y subject to the connection control, which are indicated as A, B; C, D, with respect to each of the address translation function identifiers NAT#1, NAT#2. . . .

The function managing table 431A enables the concentrated address translation system to identify a user network in terms of an interface, thereby allowing communications between different user networks to be separately processed. If different user networks use a duplicate network address, an identification of a particular user network is enabled by recognizing an interface which has received the packet.

As illustrated in FIG. 9 as an example, the address translation table 41AT contains records indicating a direction in which a packet is to be transferred, old addresses or addresses before the translation (which are indicated in FIG. 9 as "a", "b", "c", "d", "e", "f") of all the sender terminals subject to the connection control, new addresses or addresses after the translation, and a translation process. The translation process includes a dynamic assignment of a translated address to a terminal, and a fixed assignment of an address to a particular terminal.

The address translation function parts NAT#1, NAT#2 are specified by an address translation function identifier added to the packet from the address translation function selector 433A, and represent functions which are carried out by the network interconnection controller 41. Specifically, the network interconnection controller 41 retrieves the address translation table 41AT on the basis of the address translation function identifier added to the packet and the private address of the sender terminal, and reads a corresponding translated address (global address).

Although a single terminal is connected to each one of the user networks in FIG. 2, it is assumed in the address translation table 41AT shown in FIG. 9 that six terminals having private addresses a to f are connected to the user network 11 and similarly six terminals having the same private addresses "a" to "f" are connected to the user network 13. It is assumed that the terminals connected to the user networks 12, 14 use global addresses. Accordingly, when a transmission occurs from these terminals on the user networks 12 and 14, there is no need for the address translation.

According to the address translation table shown in FIG. 9, the address translation function part NAT#1 performs connection control with respect to the addresses "a" to "f" of the terminals connected to the user network 11. For example, it translates a private address "a" or "b" to a global address "aa1" and translates a private address "c" or "d" to a global address "cc1" for a series of packets. On the other hand, the addresses "e" and "f" are translated into fixed addresses "ee1" and "ff1", respectively. In the example of FIG. 9, the address translation function part NAT#2 performs a similar connection control with respect to the address of a terminal connected to the user network 13, thus translating an address "a" or "b" to "aa2" and translating addresses "c" or "d" to "cc2" while translating addresses "e" and "f" to "ee2" and "ff2", respectively.

In this manner, according to the invention, the function association selector 43 determines which address translation function part is applied to the interface which has received a packet from a user network, and that address translation function part performs an address translation for the packet in order to deliver the packet to an interface which forms a pair with the packet receiving interface. Accordingly, each of the address translation function parts cannot receive a packet from interfaces other than these corresponding interfaces.

More specifically, if the terminal 21 on the user network 11 and the terminal 23 on the user network 13 happen to have a common private address "a", a packet received by the interface IF-A from the terminal 21 is associated to the address translation function part NAT#1 by the function association selector 43 to be subject to an address translation by the address translation function part NAT#1. Similarly, a packet received by the interface IF-C from the terminal 23 is associated to the address translation function part NAT#2 by the function association selector 43 and is subject to an address translation by the address translation function part NAT#2. Thus, if the terminal 23 connected to the user network 13 has the address "a", the packet received by the interface IF-C from the terminal 23 cannot be subject to an address translation by the address translation function part NAT#1.

When it is desired to add a terminal to an existing user network of the network system, it is only necessary that an address translation function identifier corresponding to the new terminal address be added to the address translation function identifiers contained in the address translation table 41AT together with a set-up of a corresponding address translation.

When adding a new pair of user networks, two new interfaces corresponding to the pair of user networks are provided, and a connection control therefor is established by adding new address translation function identifiers corresponding to the pair of interfaces and the addresses of the terminals connected to the user networks to the address translation table 41AT. The association between the added address translation function identifier and the interface can be accommodated for by an addition to the translation function managing table 431A of the function association selector 43. The only hardware which is added anew is the interfaces. By contrast, according to the conventional network system, a new address translation system must be added for the added pair of user networks.

In this manner, a new address translation function part may be added and operated by adding a new address translation function identifier, a direction of transfer and a connection control rule (a relationship between an old address and a new address) as items in the address translation table 41AT. By using the address translation table thus constructed and retrieving from the table by using the address translation function identifier imparted to the packet as a retrieval key, the address translation function part which is to be used for the packet can be determined. A packet from a different user network, if it has a common network address (private address), is given a distinct address translation function identifier as a result of a difference in the input interface, thus assuring the operation of an independent address translation function part.

The address translation table 41AT is provided as a single chart of address translations for all the address translation function parts NAT#1, NAT#2. . . , but may be separately provided for each address translation function part.

Figure 10:
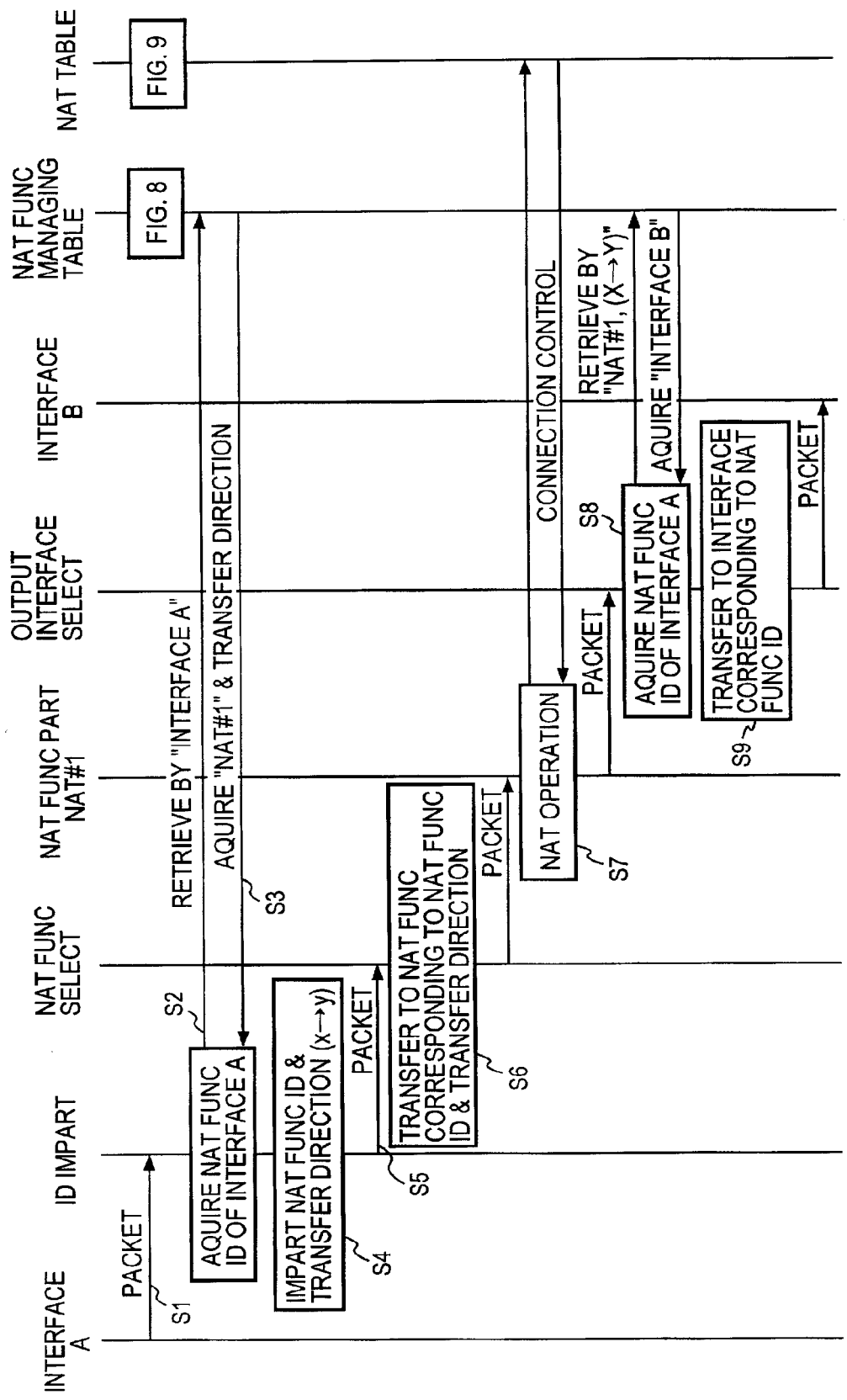
FIG. 10 is an illustration of operation of the concentrated address translation system.

FIG. 10 illustrates an overall operation of the concentrated address translation system shown in FIG. 7.

By way of example, when the interface IF-A receives a packet from the user network 11 (step S1), the identifier imparting unit 432 retrieves the address translation function managing table 431A shown in FIG. 8 (step S2) to acquire the address translation function identifier NAT#2 and direction of transfer, which is x→y in this example, corresponding to the interface IF-A (which is simply shown as A in FIG. 10) having received the packet (step S3), imparts them to the packet (step S4) and transfers the packet to the address translation function selector 433A (step S5). It is assumed in the table shown in FIG. 8 that for each pair of interfaces IF-x, IF-y, when the packet is received by one of them, the packet is transferred to the other as a result of the connection control, and the direction of transfer is indicated as x→y or y→x.

On the basis of the address translation function identifier NAT#1 imparted to the packet, the address translation function selector 433A transmits the packet to the corresponding address translation function part NAT#1 (step S6).

The address translation function part NAT#1 retrieves the address translation table 41AT in terms of the address translation function identifier and the private address "a" of the sender terminal to acquire a corresponding translated address "aa", which is substituted for the private address "a" of the packet and transmits the packet to the output interface selector 434 (step S7).

When the output interface selector 434 receives the packet which is delivered as a result of the connection control by the address translation function part NAT#1, it retrieves the address translation function managing table 431A to acquire an output interface, which is B in the present example, that corresponds to the address translation function identifier imparted to the communication and direction of the transfer (step S8), and transfers the packet to the output interface B (step S9).

Figure 11:
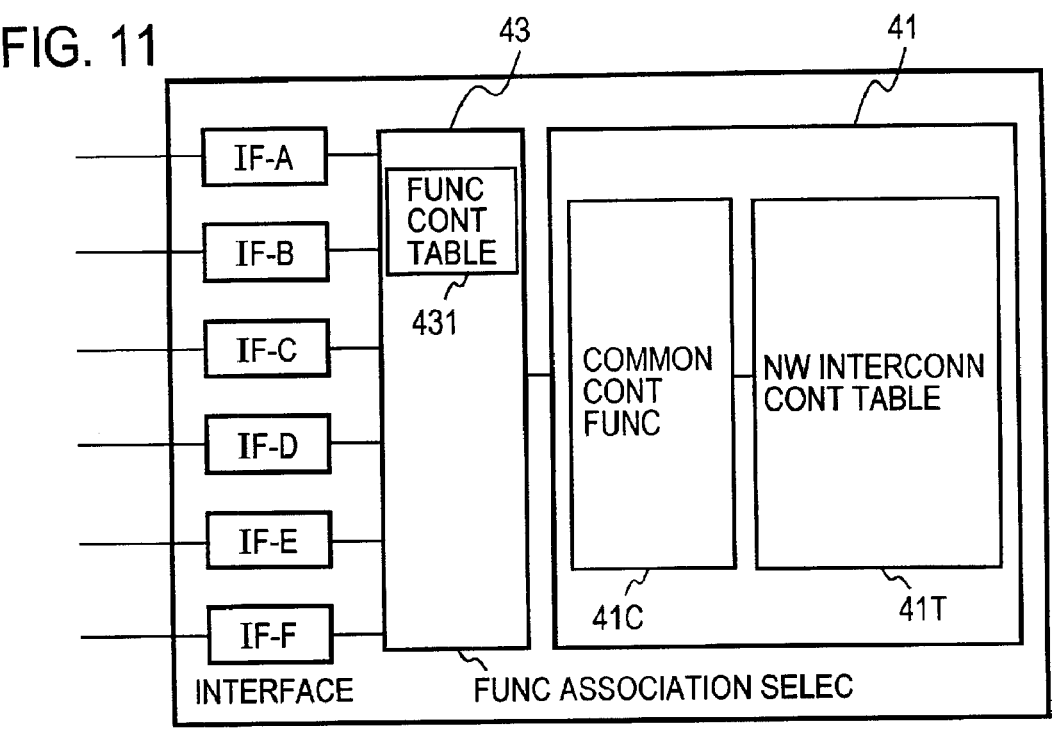
FIG. 11 is a block diagram of an arrangement in which the concentrated network interconnection control system shown in FIG. 2 is implemented in terms of devoted hardware.

FIG. 11 shows an arrangement in which the embodiment of the network interconnection control system shown in FIG. 2 is implemented in a devoted hardware. In the similar manner as the network interconnection control system shown in FIG. 2, there are provided interfaces IF-A to IF-F, a function association selector 43 and a network interconnection controller 41. The network interconnection controller 41 comprises a common controller 41C and a network interconnection control table 41T. It is to be understood that the function association selector 43 and the network interconnection controller 41 are formed by devoted logic circuits.

In the similar manner as in the embodiments shown in FIGS. 3 and 7, the function association selector 43 determines an interface which received a packet, imparts a control function identifier which corresponds to this interface to the packet by referring to a function managing table 431, and forwards the packet to the common controller 41C of the network interconnection controller 41. The common controller 41C retrieves the network interconnection control table 41T based on the control function identifier imparted to the packet, applies a corresponding connection control to the packet and then forwards it to the function association selector 43. The function association selector 43 acquires the direction of transfer which corresponds to the control function identifier by referring to the function managing table, removes the identifier and transfers the packet to the corresponding interface.

In this manner, a single concentrated network interconnection control system may be provided for all the user networks even when the concentrated network interconnection control system of the invention is implemented in a devoted hardware, and thus the installation cost and the maintenance cost can be reduced. When it becomes necessary to add a new terminal to a user network or to add a new user network, an additional interface or interfaces may be required, but there is no need for an addition of hardware otherwise, the only requirement being that a corresponding connection control information may be added to the function managing table 431 and/or network interconnection control table 41T.

Figure 12:
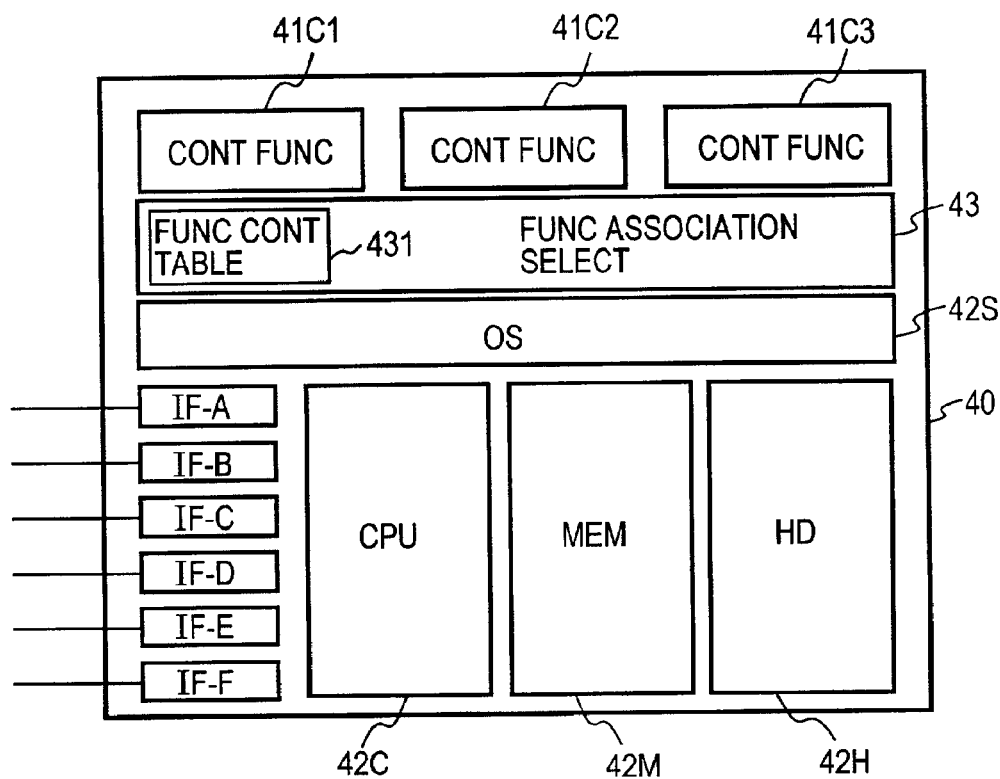
FIG. 12 is a block diagram of an arrangement in which the concentrated network interconnection control system shown in FIG. 2 is implemented by a computer.

As shown in FIG. 12, the concentrated network interconnection control system according to the invention as shown in FIG. 2 may be implemented by a computer comprising a CPU 42C, a memory 42M and hard disc unit 42H which are connected one another through a common bus, not shown, for example. Interfaces IF-A to IF-F are also connected to the common bus. The function association selector 43 which has been described above in connection with above embodiments as well as three control function parts 41C1, 41C2, 41C3 are provided as applications (software processes) which are executed on an operating system (OS) 42S of the computer, and these applications may be previously stored in the hard disc unit 42H. A particular application is read out of the hard disc unit 42H and written into the memory 42M to be executed by the CPU 42C. Even in this embodiment, a concentrated network interconnection control system formed by a single computer may be used for all the user networks, and thus the installation cost and the maintenance cost can be reduced.

Figure 13:
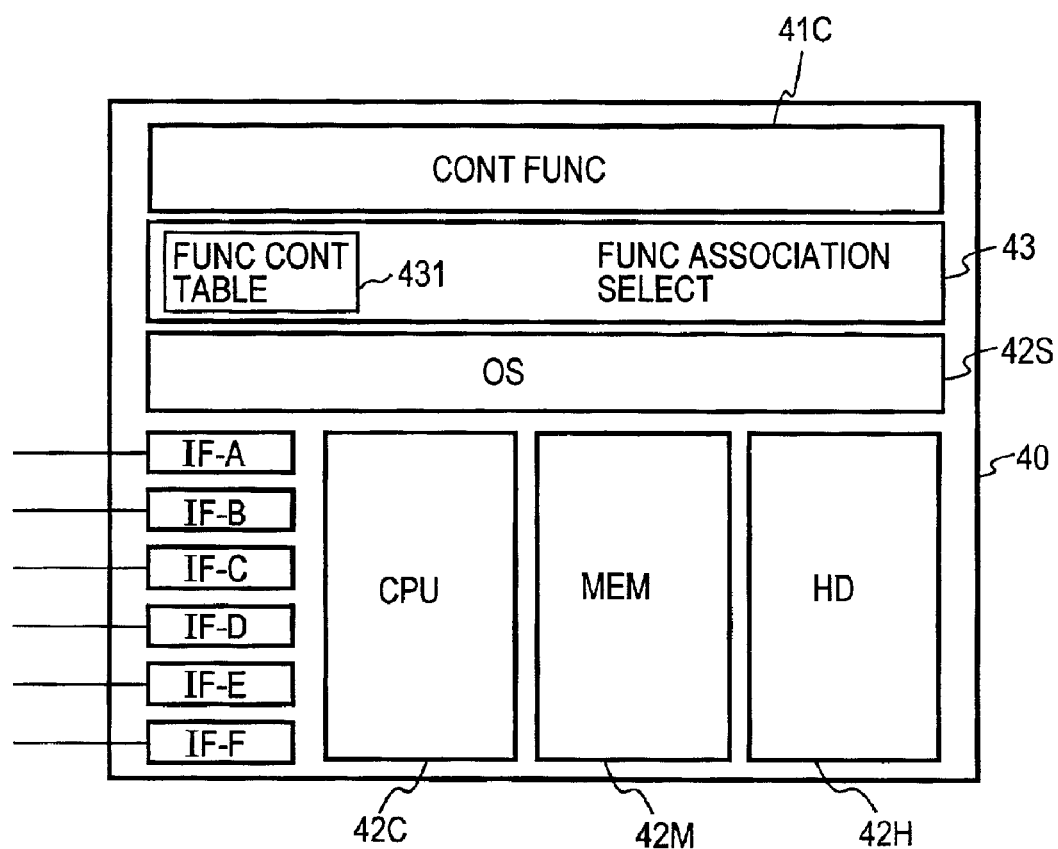
FIG. 13 is a block diagram of the arrangement shown in FIG. 2 where a plurality of control function parts are combined together into a single control function part.

In the embodiment shown in FIG. 12, the control function parts 41C1, 41C2, 41C3 may be combined into a single control function part 41C for shared use as shown in FIG. 13.

EFFECTS OF THE INVENTION

As discussed above, in accordance with the invention, a single network interconnection control system may be used to realize connections between a plurality of user networks without requiring the provision of a network interconnection control system individually for each pair of user networks even when there are a number of user networks, thus achieving an interconnection between user networks which can be easily managed at a low cost.

What is claimed is:

1. A concentrated network interconnection control system, comprising:

a plurality of interfaces connected to individual user networks configured to transmit and receive packets;

a network interconnection controller including a plurality of control function parts, each control function part independently provided for a respective pair of user networks and defining rules for connections between one of terminal addresses in one of said pair of user networks and one of terminal addresses in another one of said pair of user networks; and a function association selector configured to associate each interface to one of the plurality of control function parts, said function association selector including
a function managing table configured to store an association between each interface and a corresponding one of the control function parts, an identifier imparting part configured to retrieve an identifier from the function managing table, the identifier identifying the corresponding one of the control function parts associated with a first interface that has received a packet, and configured to impart the identifier to the packet, a function selector configured to transfer the packet to the control function part identified by the imparted identifier, and an output interface selector configured to select a second interface corresponding to the identifier imparted to the packet, via the function managing table, and configured to deliver the packet to the selected interface.

2. A concentrated network interconnection control system according to claim 1, in which the concentrated network interconnection control system represents concentrated firewall equipment.

3. A concentrated network interconnection control system according to claim 2, wherein the network interconnection controller contains a firewall table including pairs of sender and receiver terminal addresses for each pair of user networks, a direction of transfer between each pair of interfaces corresponding to each pair of sender and receiver terminal addresses, and a connection control indicating whether a connection between each pair of sender and receiver terminal addresses is enabled or rejected.

4. A concentrated network interconnection control system according to claim 1, wherein the concentrated network interconnection control system is a concentrated address translation system.

5. A concentrated network interconnection control system according to claim 4, wherein the network interconnection controller contains an address translation table including a pair of a terminal address which is to be translated and a translated address, and a direction of transfer between corresponding interfaces associated with each of the identifiers.

6. A concentrated network interconnection control system according to one of claims 1 and 4, and wherein the function association selector and the network interconnection controller are formed by devoted logic circuits.

7. A concentrated network interconnection control system according to one of claims 1 and 4, wherein the function association selector and the network interconnection controller are implemented in software executed by a computer.

* * * * *